US011703050B2

(12) United States Patent
Clements

(10) Patent No.: US 11,703,050 B2
(45) Date of Patent: Jul. 18, 2023

(54) GEAR PUMP WITH SELF-LUBRICATING BEARINGS

(71) Applicant: Eaton Intelligent Power Limited, Dublin (IE)

(72) Inventor: Martin Augustine Clements, Loveland, OH (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/467,005

(22) Filed: Sep. 3, 2021

(65) Prior Publication Data
US 2022/0074409 A1    Mar. 10, 2022

Related U.S. Application Data

(60) Provisional application No. 63/075,657, filed on Sep. 8, 2020.

(51) Int. Cl.
*F03C 2/00*  (2006.01)
*F03C 4/00*  (2006.01)
*F04C 18/00* (2006.01)
*F04C 2/18*  (2006.01)
*F16C 17/02* (2006.01)
*F16C 33/10* (2006.01)
(Continued)

(52) U.S. Cl.
CPC ........... *F04C 2/18* (2013.01); *F01C 21/02* (2013.01); *F04C 15/0026* (2013.01); *F16C 17/026* (2013.01); *F16C 33/1025* (2013.01); *F04C 2240/50* (2013.01)

(58) Field of Classification Search
CPC .... F04C 2/18; F04C 15/0026; F04C 15/0088; F04C 2210/62; F04C 2210/1044; F04C 2240/54; F04C 2240/56; F01C 21/02; F16C 2360/00; F16C 33/1025; F16C 33/103; F16C 33/1045; F16C 33/105; F16C 33/106; F16C 33/1065; F16C 33/1085

See application file for complete search history.

(56) References Cited

U.S. PATENT DOCUMENTS 2,887,058 A    5/1959  Aspelin et al.
2,891,483 A *  6/1959  Murray ............... F04C 15/0026
                                                    418/132

(Continued)

FOREIGN PATENT DOCUMENTS

EP    0 669 465 A2    8/1995
EP    1 855 007 A1   11/2007
(Continued)

OTHER PUBLICATIONS

Extended European Search Report for Application No. 21195631.3 dated Feb. 8, 2022.
(Continued)

*Primary Examiner* — Theresa Trieu
(74) *Attorney, Agent, or Firm* — Merchant & Gould P.C.

(57) ABSTRACT

A gear pump that selectively directs lubrication to certain components within the pump. A system and method of retrofitting existing pumps to improve their longevity in the field. The system and method provides a clean, simple, efficient, and elegant improvement to current gear pump fuel delivery systems.

13 Claims, 17 Drawing Sheets

(51) Int. Cl.
*F04C 15/00* (2006.01)
*F01C 21/02* (2006.01)

(56) References Cited

U.S. PATENT DOCUMENTS

| | | | | |
|---|---|---|---|---|
| 3,447,472 A * | 6/1969 | Hodges | ............... | F04C 2/088 |
| | | | | 418/79 |
| 3,490,382 A * | 1/1970 | Joyner | ............... | F04C 15/0088 |
| | | | | 418/102 |
| 3,748,063 A | 7/1973 | Putnam | | |
| 6,123,531 A | 9/2000 | Blume et al. | | |
| 6,991,442 B2 * | 1/2006 | Meguro | ............... | F04C 2/086 |
| | | | | 418/206.1 |
| 8,959,920 B2 | 2/2015 | Clements | | |
| 11,060,560 B2 | 7/2021 | Clements | | |
| 2009/0169408 A1 | 7/2009 | Thebe et al. | | |
| 2011/0014080 A1 * | 1/2011 | Robillard | ............... | F04C 2/18 |
| | | | | 418/206.7 |
| 2018/0340471 A1 | 11/2018 | Nyzen et al. | | |

FOREIGN PATENT DOCUMENTS

| | | |
|---|---|---|
| GB | 738 782 A | 10/1955 |
| GB | 2 980 353 A1 | 2/2016 |
| WO | 01/51813 A1 | 7/2001 |
| WO | 2017/066456 A1 | 4/2017 |

OTHER PUBLICATIONS

Great Britain Search Report for Application No. GB2112718.8 dated Feb. 18, 2022.

\* cited by examiner

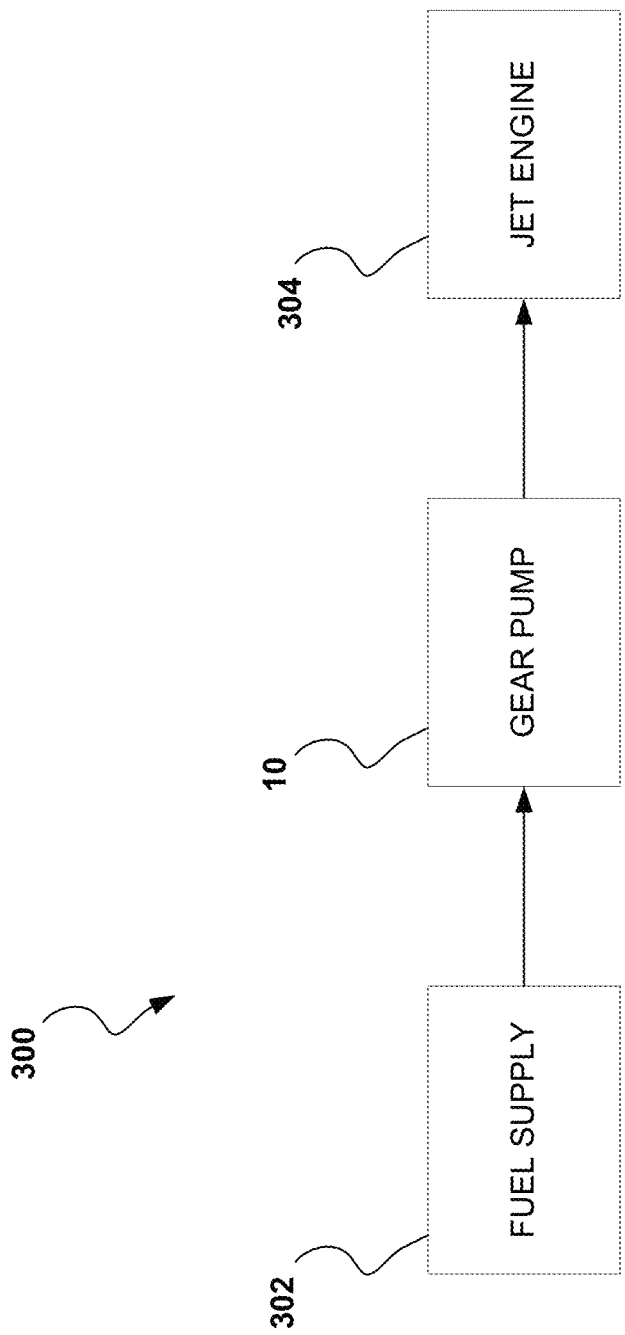

GEAR PUMP WITH SELF-LUBRICATING BEARINGS

CROSS-REFERENCE TO RELATED APPLICATION

This application claims priority to U.S. Provisional Application Ser. No. 63/075,657, filed on Sep. 8, 2020, the disclosure of which is incorporated herein by reference in its entirety.

TECHNICAL FIELD

A system and method for providing adequate, reliable, and variable fluid flow to a journal bearing of the fuel gear pump during different modes of operation.

BACKGROUND

Pumps come in a variety of types and have a variety of different applications. One type of known pump is a gear pump. One of the many applications of a gear pump is to pressurize and deliver jet fuel to a jet engine.

In certain fuel delivery gear pump configurations, the pressurized fluid that flows through the gear pump is used to lubricate internal components of the gear pump. In some configurations, the pressurized fluid is directed to an interface between a journal bearing and a rotating shaft (i.e., bearing shaft interface). The amount of lubrication desired at the bearing interface depends in part on the speed of rotation of the shaft and the pressure delivered by the pump, which are correlated to the amount of frictional forces that would be generated at the bearing shaft interface.

Gear pumps for fuel delivery are sized and configured to provide sufficient fuel pressure and lubrication to the bearing shaft interface at all operating rotational speeds and for the entire useful life of the pump. Some expected degradation of the pump components over time is accounted for in the proper sizing of the pump. Efforts have been made to improve the design of gear pumps. Example gear pumps are disclosed in: U.S. Pat. No. 11,060,560 to Clements; U.S. Pat. No. 8,959,920 to Clements; and US Pat. App. Pub. No. 2018/0340471 to Nyzen et al. filed on Apr. 26, 2018, all of which are hereby incorporated by reference in their entirety.

SUMMARY

The present disclosure provides a gear pump that selectively directs lubrication to certain components within the pump. In one embodiment, when the pressure of the fluid in the pump exceeds a threshold pressure, flow paths within the pump automatically open and allow fluid in the pump to flow to a shaft bearing interface. When the pressure of the fluid in the pump is lower than a threshold pressure, the certain flow paths within the pump are closed to increase the operational efficiency of the pump. Pumps of the present disclosure have a prolonged useful life as the present disclosure minimizes parasitic loss (e.g., internal leakage) in the pump, thereby effectively increasing the pump flow capacity to permit increased flow degradation before reaching useful life flow limits of the pump. The present disclosure provides a system and method of retrofitting existing pumps to improve their longevity in the field. In addition, the features of the present disclosure can be incorporated into new pumps without extensive redesign of the pumping systems. The system and method of the present disclosure provides a clean, simple, efficient, and elegant improvement to current gear pump fuel delivery systems. In some embodiments, the service life of the fuel delivery gear pump can be as long as the overall useful life of the engine of which it delivers fuel.

BRIEF DESCRIPTION OF THE FIGURES

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 17 is a block diagram of a jet engine fuel delivery system according to the principles of the present disclosure.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

Figure 1:
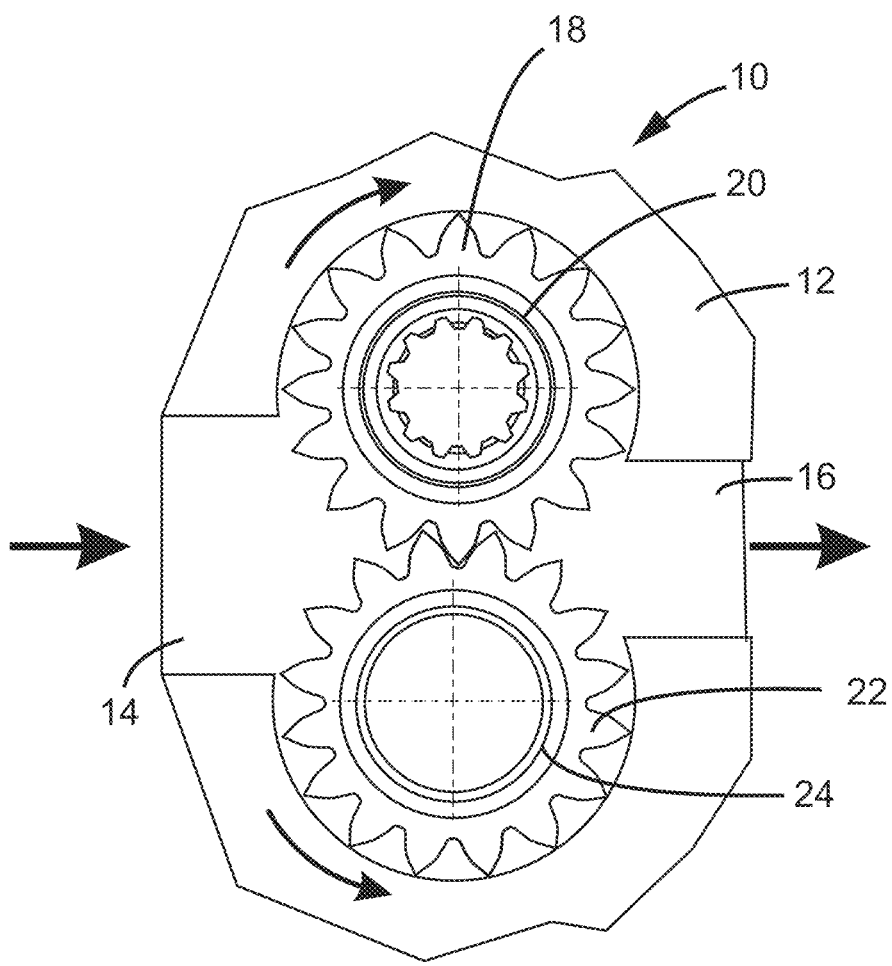
FIG. 1 is a schematic cross-sectional illustration of a gear pump consistent with the principles of the present disclosure.

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Aircraft engine gear pumps have pressure-fed bearings to improve the load carrying capability of the gear stage bearings. Directed pressurized lubrication to lubricate the bearings results in parasitic loss to the pump's flow capacity and must be accounted for when sizing the pump. In the case of aircraft engine gear type pumps, pumps are typically sized to provide sufficient performance at an engine start condition. One start condition is when the engine is off while the aircraft is in flight. In this condition, the engine turbine rotates due to the movement of the air through the engine. This start condition is referred to as a windmill condition. When sizing the pump to perform at windmill, the fuel pump is typically oversized for all other operating conditions.

The present disclosure provides a pump that performs at windmill yet does not need to be grossly oversized for other operating conditions of the system. At conditions such as windmill where the speed is low and the bearing loads are relatively low, there is not a need for pressurized lubricating flow at the bearing shaft interface.

The principles of the present disclosure allow for the pressurized bearing lubrication flow to be shut off at low load conditions thereby reducing parasitic losses and allowing the pump to be sized smaller and/or operate for longer periods of time before reaching useful flow life limits. The decrease in parasitic loss at the windmill condition increases pump flow capacity at windmill for a particular sized pump.

The present disclosure provides a pump that retains the capability of full flow when necessary at high bearing loads. The principles of the present disclosure enable smaller pumps for fuel delivery to be used.

Additionally, the present disclosure provides redundancy in the supply of pressurized bearing lubrication flow to improve reliability for when pressurized bearing lubrication flow is desired.

In addition, since parasitic losses are minimized, the pump of the present disclosure has an extended useful on-wing life. The in-service life of a pump is increased and thus reduces the frequency of pump overhauls.

In the depicted embodiment, the principles of the present disclosure can be incorporated into the pump bearings. Therefore, advantages of the present disclosure can be incorporated into existing gear pump systems by swapping out the original bearings with the improved bearings thereby increasing the life of pumps currently fielded with minimal expense.

Figure 7:
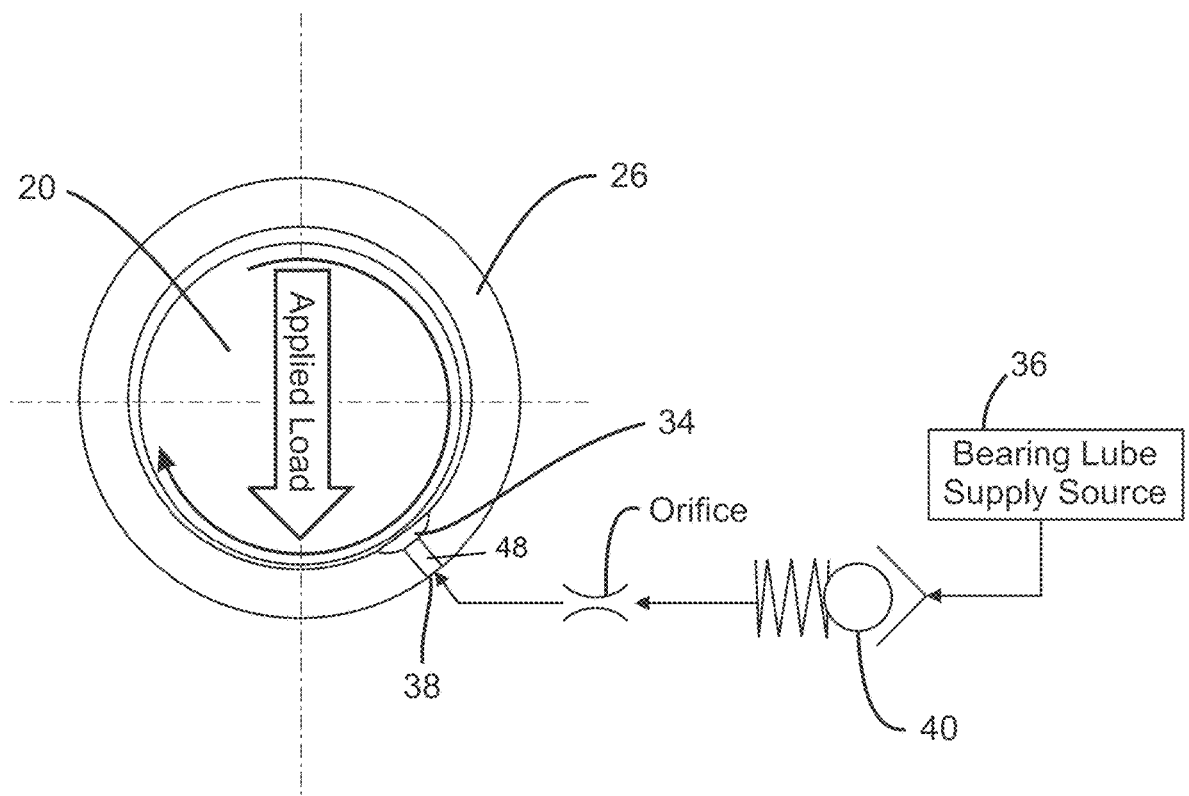
FIG. 7 is a schematic cross-sectional view of the shaft and bearing arrangement of the gear pump according to the principles of the present disclosure.

Referring to FIG. 7, a schematic illustration of an embodiment of the present disclosure is shown. The proposed bearing lubrication flow system includes a pressure relief valve to shut off bearing lube flow when bearing feed pressure is lower than the relief valve crack point. In the depicted embodiment, the bearing feed pressure is based on the pump discharge pressure. In the depicted embodiment, at windmill conditions, the pump discharge pressure is less than ten percent of the maximum pressure rating for the pump. In the depicted embodiment, at these reduced pressures, the pressure relief valve will be closed thereby not allowing pump discharge fluid to flow to the bearing shaft interface.

In the depicted embodiment, as the engine powers up, the rotations per minute of the engine increases and the gear pump is driven faster to deliver the sufficient fuel to the engine and higher discharge pressures are generated in the pump. In the depicted embodiment, the pump discharge pressure rises to a level that will exceed the relief valve crack point. Once the pressure reaches a threshold pressure, the relief valve opens initiating the flow of pressurized fluid to lubricate the bearing shaft interface. In the depicted embodiment, an orifice in series with the relief valve limits the lubrication flow to the desired characteristics based on bearing lube supply (pump discharge) pressure levels.

Figure 8:
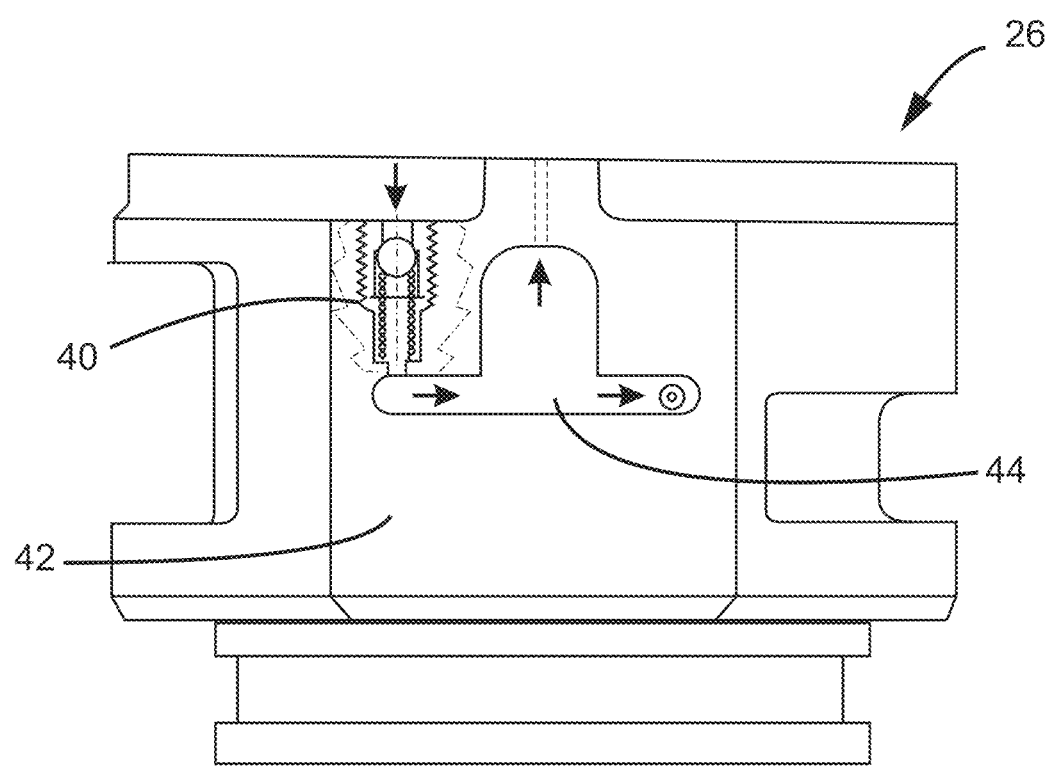
FIG. 8 is a bottom view of a bearing of the gear pump according to the principles of the present disclosure.
Figure 9:
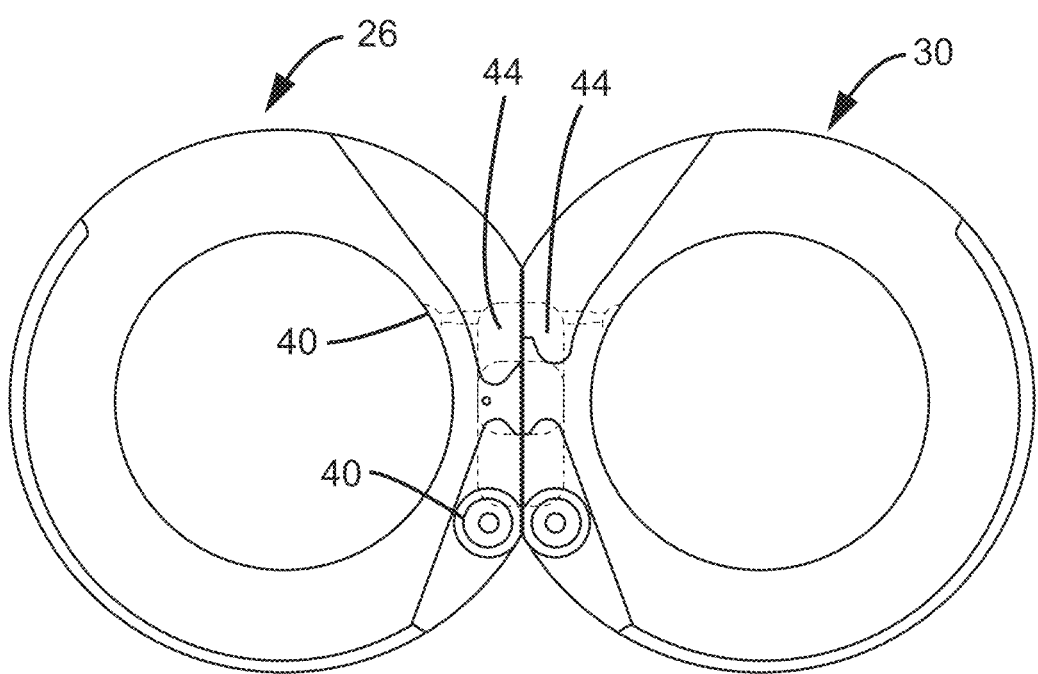
FIG. 9 is an end view of a pair of bearings of the gear pump according to the principles of the present disclosure.
Figure 10:
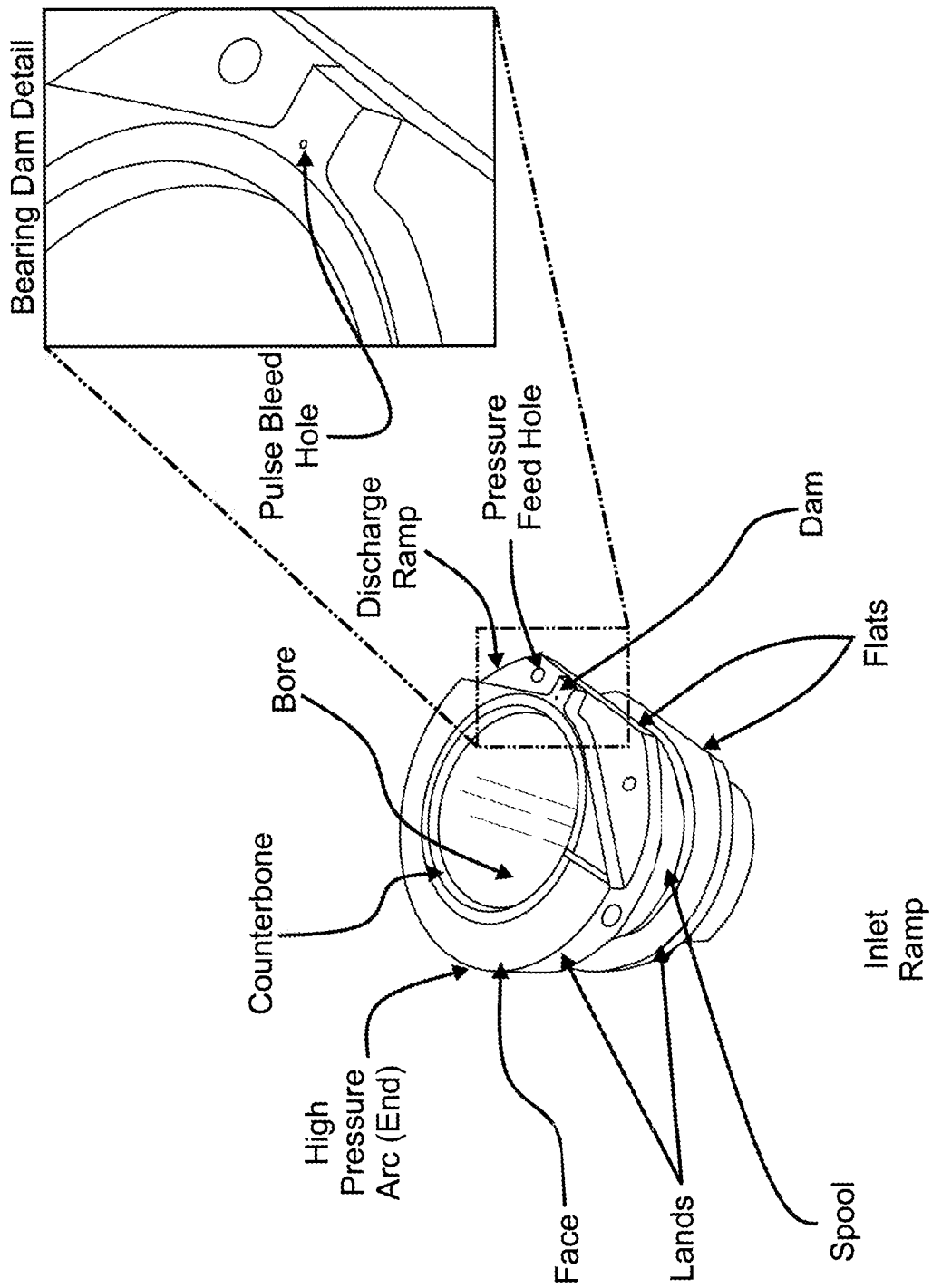
FIG. 10 is an isometric view of a bearing of the gear pump according to the principles of the present disclosure prior to retrofitting.

In the depicted embodiment, at pressures where lubrication feed is desired, redundancy is built such that the bearing shaft interface will receive forced lubrication even if one of the valves malfunctions. Referring to FIGS. 8-9 in the depicted embodiment, the system includes a relief valve and feed orifice in each of the four gear stage bearings. In the depicted embodiment, the post-relief valve flows from each bearing pair's relief valve for use by both bearings in the pair should the relief valve of a single bearing malfunction (i.e., fail to open).

The present disclosure also provides a mechanism for the switching off of the pulse bleed flow function under the low power conditions. In the depicted embodiment, the pulse bleed flow path that exits on the end face of the journal bearing receives its pressurized flow from the main flow path that extends between the high-pressure area and the bearing shaft interface. Therefore, when the main flow is closed, no pressurized fluid is driven to the pulse bleed flow path. In the depicted embodiment, since the pulse bleed flow path is downstream of the pressure relief valve in the main flow path, the pulse bleed flow path can be shut off at lower pressure conditions such as at the windmill condition.

In the depicted embodiment, the ability to switch on or off the lubrication reduces the parasitic losses at windmill thereby improving the in-service life of a given pump. In addition, the switchable feature now allows the optimization of the bearing lubrication and pulse bleed feed flows without compromising performance of the pump at the windmill condition. Optimizing bearing lubrication flow could result in increased pump pressure output capability. Optimization of the pulse bleed function could lead to a decrease in gear stage flow degradation due to cavitation and thus extending the in-service life of the pump.

The system and method of the depicted embodiment allows for a relatively low-cost approach to extending pump in-service life. The features of the present disclosure can be accomplished with modifications to existing bearings. The modifications do enable reverse compatibility (retrofitting) confined within the gear stage bearings which are typically replaced at each pump overhaul. Expense in extensive redesign and hardware replacement is avoided by placing the relief valve feature in each of the four gear stage bearings.

Referring to the figures generally, the present disclosure provides a gear pump 10. The gear pump 10 includes a pump housing 12, the housing 12 including a fluid inlet 14 and a fluid outlet 16. The gear pump 10 includes a drive gear 18 supported on a first shaft 20, the drive gear 18 located between a first end portion of the first shaft 20 and a second end portion of the first shaft 20. The gear pump 10 includes a driven gear 22 configured to mesh with the drive gear 18. The driven gear 22 is supported on a second shaft 24, the driven gear 22 located between a first end portion of the second shaft 24 and a second end portion of the second shaft 24. The gear pump 10 includes a first journal bearing 26 secured in the pump housing 12 configured to rotatably support the first end portion of the first shaft 20. The first journal bearing 26 defines a first bearing shaft interface 34, the first journal bearing 26 includes a first high pressure portion 36, a first journal fluid flow path 38 that extends between the first high pressure portion 36 and the first bearing shaft interface 34, and a first journal pressure relief valve 40 in the first journal fluid flow path 38. The gear pump 10 includes a second journal bearing 28 secured in the pump housing 12 configured to rotatably support the second end portion of the first shaft 20. The second journal bearing 28 defines a second bearing shaft interface, the second journal bearing 28 including a second high pressure portion, a second journal fluid flow path that extends between the second high pressure portion and the second bearing shaft interface, and a second journal pressure relief valve in the second journal fluid flow path. The gear pump 10 includes a third journal bearing 30 secured in the pump housing 12 configured to rotatably support the first end portion of the second shaft 24. The third journal bearing 30 defines a third bearing shaft interface, the third journal bearing 30 including a third high pressure portion, a third journal fluid flow path that extends between the third high pressure portion and the third bearing shaft interface, and a third journal pressure relief valve in the third journal fluid flow path. The gear pump 10 includes a fourth journal bearing 32 secured in the pump housing 12 configured to rotatably support the second end portion of the second shaft 24. The fourth journal bearing 32 defines a fourth bearing shaft interface, the fourth journal bearing 32 including a fourth high pressure portion, a fourth journal fluid flow path that extends between the fourth high pressure portion and the fourth bearing shaft interface, and a fourth journal pressure relief valve in the fourth journal fluid flow path.

It should be appreciated that many alternative configurations are possible. For example, in one alternative embodiment, there is only one pressure relief valve in one of the four above-described journal bearings. Alternatively, there could be two pressure relief valves wherein one pressure relief valve is in, for example, the first journal bearing and another pressure relief valve is in the second journal bearing. Alternatively, the one or more pressure relief valves could be located physically outside of the journal bearing yet still in the flow path of one or more of the journal bearings. Many other alternative configurations are also possible.

In the depicted embodiment, the gear pump 10 is a component in a jet engine fuel delivery system 300 and is configured for in-flight delivery of jet fuel 302 to a jet engine 304.

In the depicted embodiment, the first journal bearing 26 and the third journal bearing 30 include journal contact portions 42 that are in direct contact with each other. In the depicted embodiment, a portion of the first journal fluid flow path 38 is open to a portion of the third journal fluid flow path in the journal contact portion 42 thereby defining a joint fluid flow path 44 that allows fluid to flow from the first journal to the third journal and from the third journal to the first journal.

In the depicted embodiment, the second journal bearing 28 and the fourth journal bearing 32 include journal contact portions that are in direct contact with each other. In the depicted embodiment, a portion of the second journal fluid flow path is open to a portion of the fourth journal fluid flow path in the journal contact portion thereby defining a joint fluid flow path that allows fluid to flow from the second journal to the fourth journal and from the fourth journal to the second journal.

In the depicted embodiment, the first journal pressure relief valve 40, the second journal pressure relief valve, the third journal pressure relief valve, and the fourth journal pressure relief valve all are configured to allow flow therethrough at a common predetermined pressure. Alternatively, the predetermined pressure could be set at a different crack pressure.

In the depicted embodiment, the gear pump 10 includes a feed orifice 48 at a junction of the first journal fluid flow path 38 and the first bearing shaft interface 34.

In the depicted embodiment, the first journal pressure relief valve 40 is at least partially recessed in the first journal bearing 26.

In the depicted embodiment, a gear pump 10 is provided that includes a pump housing 12 including a fluid inlet 14 and a fluid outlet 16. A drive gear 18 is supported on a first shaft 20, the drive gear 18 being located between a first end portion of the first shaft 20 and a second end portion of the first shaft 20. A driven gear 22 is configured to mesh with the drive gear 18, the driven gear 22 supported on a second shaft 24, the driven gear 22 being located between a first end portion of the second shaft 24 and a second end portion of the second shaft 24. A first journal bearing 26 secured in the pump housing 12 configured to rotatably support the first end portion of the first shaft 20, the first journal bearing 26 defining a first bearing shaft interface 34, the first journal bearing 26 including a first high pressure portion 36, a first journal fluid flow path 38 that extends between the first high pressure portion 36 and the first bearing shaft interface 34; a second journal bearing 28 secured in the pump housing 12 configured to rotatably support the second end portion of the first shaft 20, the second journal bearing 28 defining a second bearing shaft interface, the second journal bearing 28 including a second high pressure portion, a second journal fluid flow path that extends between the second high pressure portion and the second bearing shaft interface; a third journal bearing 30 secured in the pump housing 12 configured to rotatably support the first end portion of the second shaft 24, the third journal bearing 30 defines a third bearing shaft interface, the third journal bearing 30 including a third high pressure portion, a third journal fluid flow path that extends between the third high pressure portion and the third bearing shaft interface; a fourth journal bearing 32 secured in the pump housing 12 configured to rotatably support the second end portion of the second shaft 24, the fourth journal bearing 32 defines a fourth bearing shaft interface, the fourth journal bearing 32 including a fourth high pressure portion, a fourth journal fluid flow path that extends between the fourth high pressure portion and the fourth bearing shaft interface; and a pressure relief valve in at least one of the first, second, third, or fourth journal fluid flow paths.

In the depicted embodiment, a journal bearing for a gear pump 10 is provided. The journal bearing includes a journal bearing configured to rotatably support a portion of a shaft, the journal bearing defining a bearing shaft interface, the journal bearing including a high pressure portion, a journal fluid flow path that extends between the high pressure portion and the bearing shaft interface, and a journal pressure relief valve in the journal fluid flow path.

Figure 11:
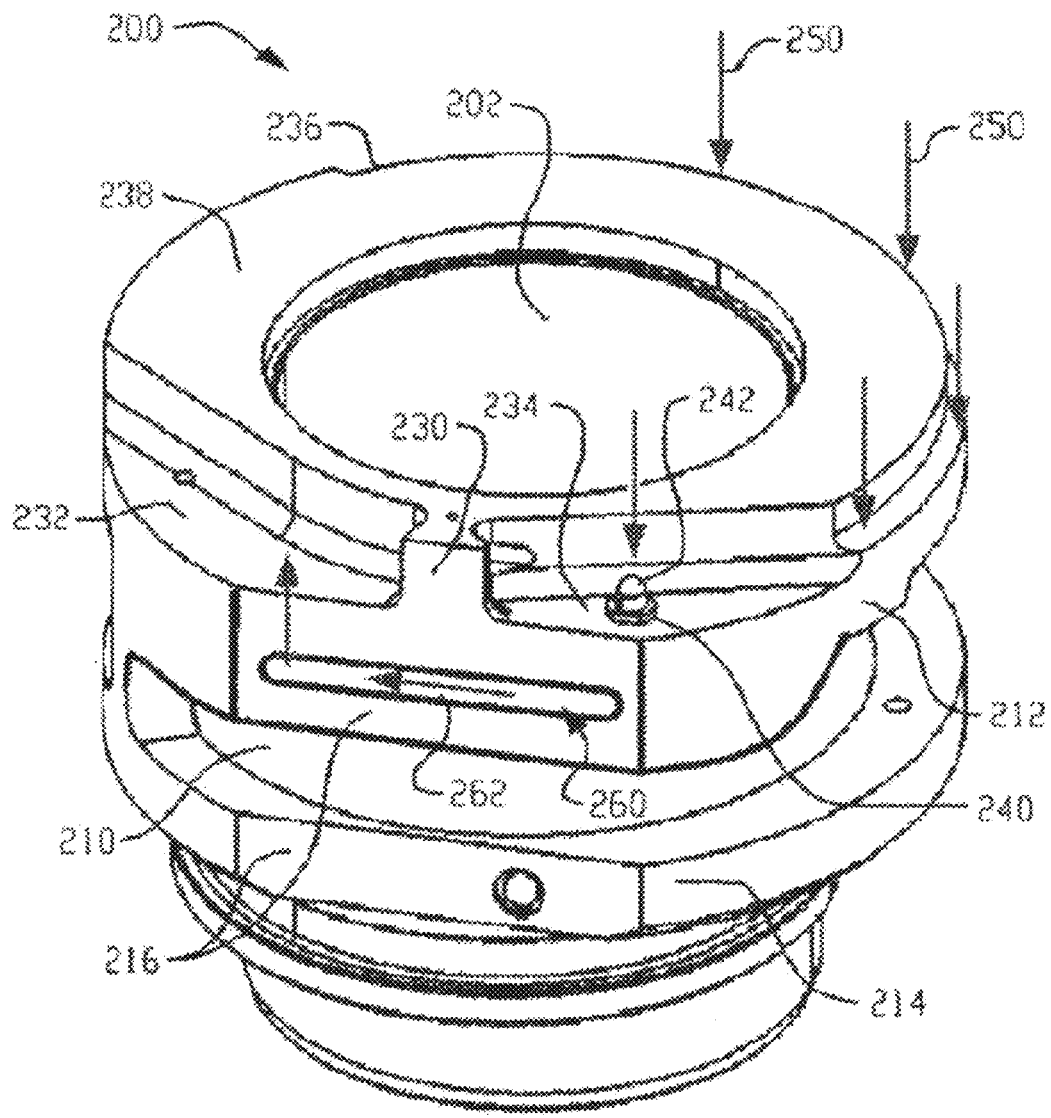
FIG. 11 is an isometric view of a bearing of the gear pump according to the principles of the present disclosure prior to retrofitting.
Figure 12:
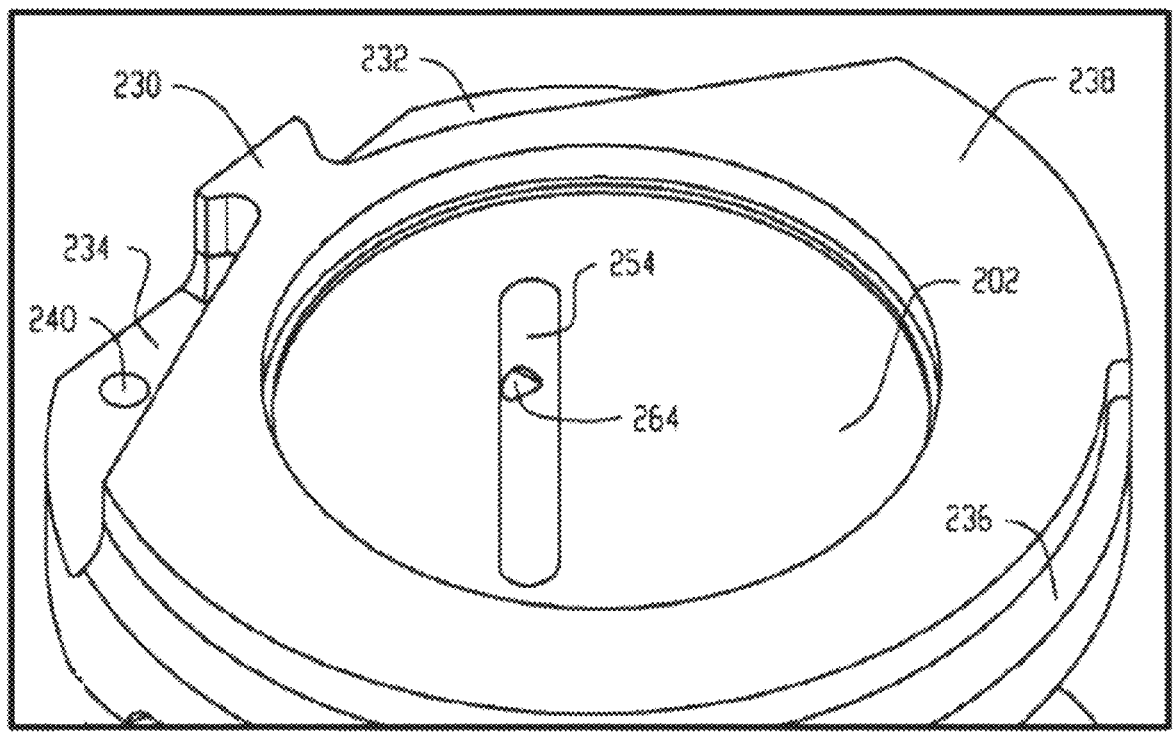
FIG. 12 is an isometric view of the inside of the bearing of the gear pump according to the principles of the present disclosure.
Figure 13:
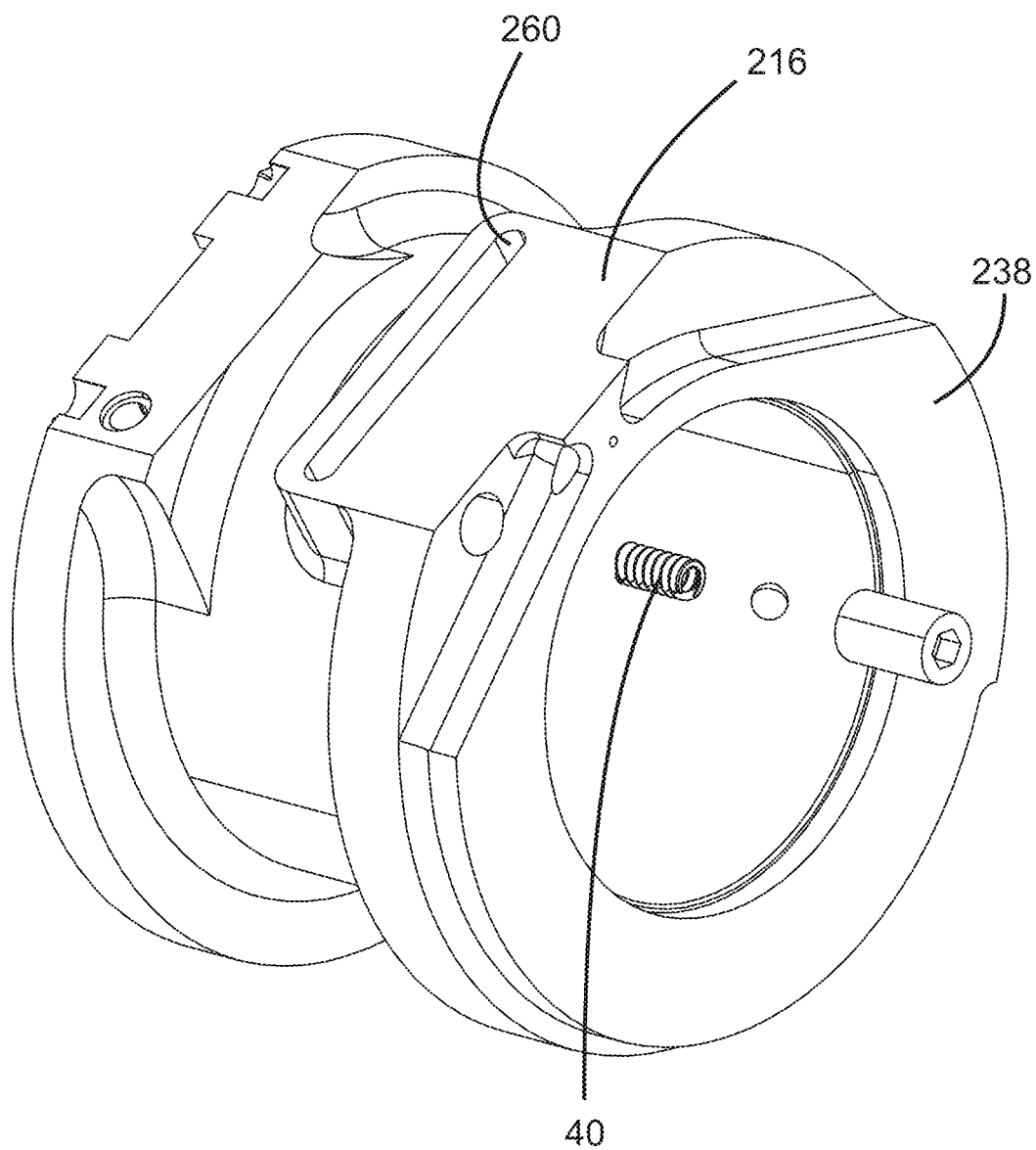
FIG. 13 is an isometric view of a bearing of the gear pump according to the principles of the present disclosure.
Figure 14:
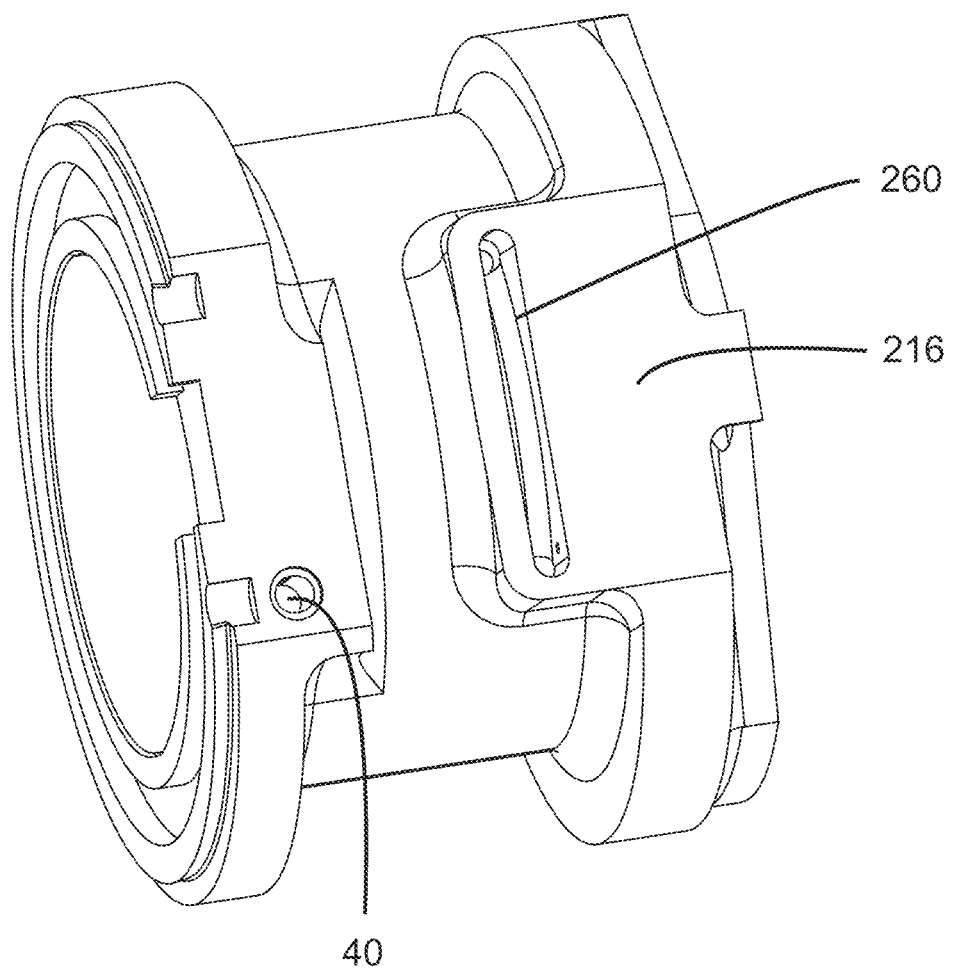
FIG. 14 is an isometric view of a bearing of the gear pump according to the principles of the present disclosure.
Figure 15:
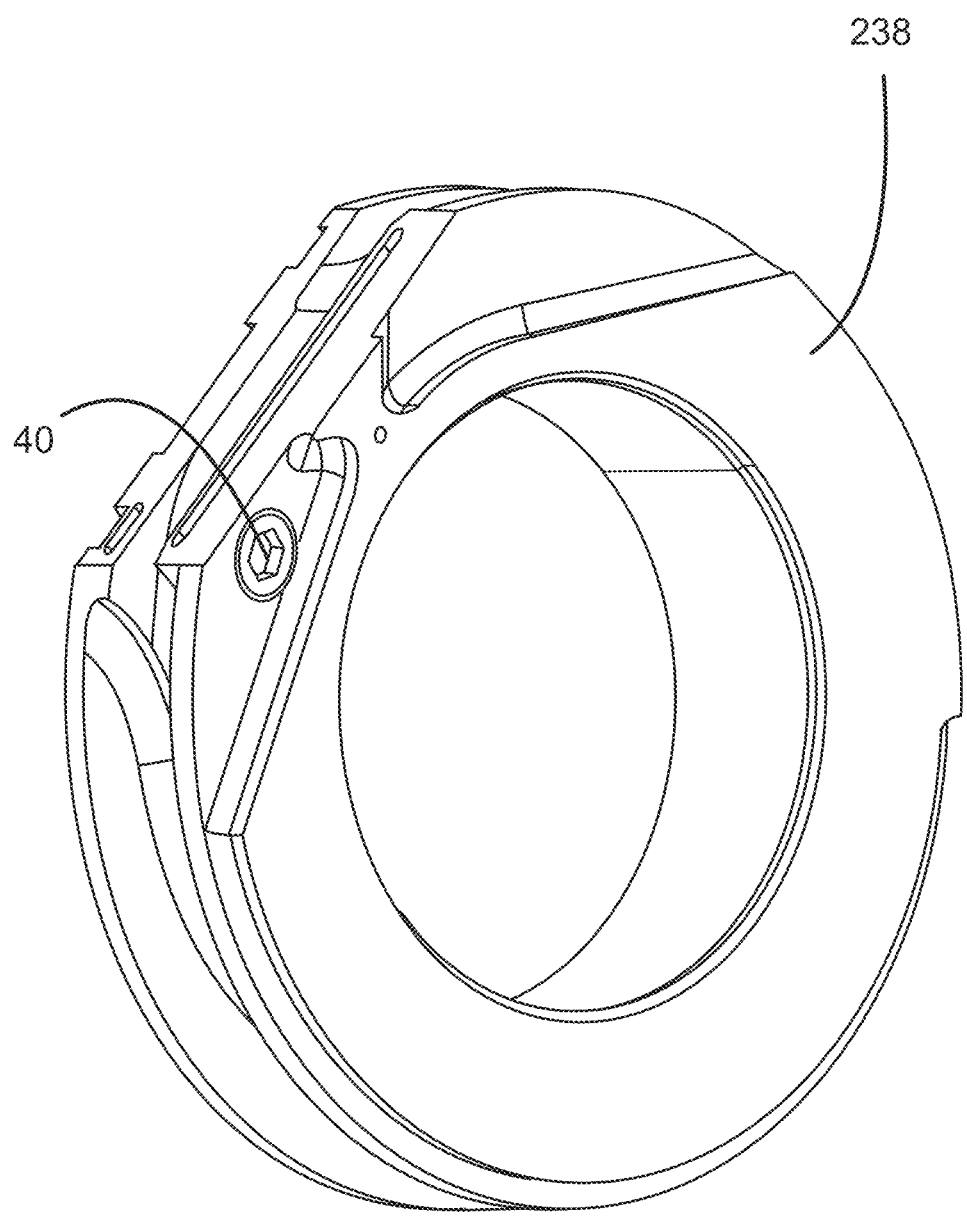
FIG. 15 is an isometric view of a bearing of the gear pump according to the principles of the present disclosure.
Figure 16:
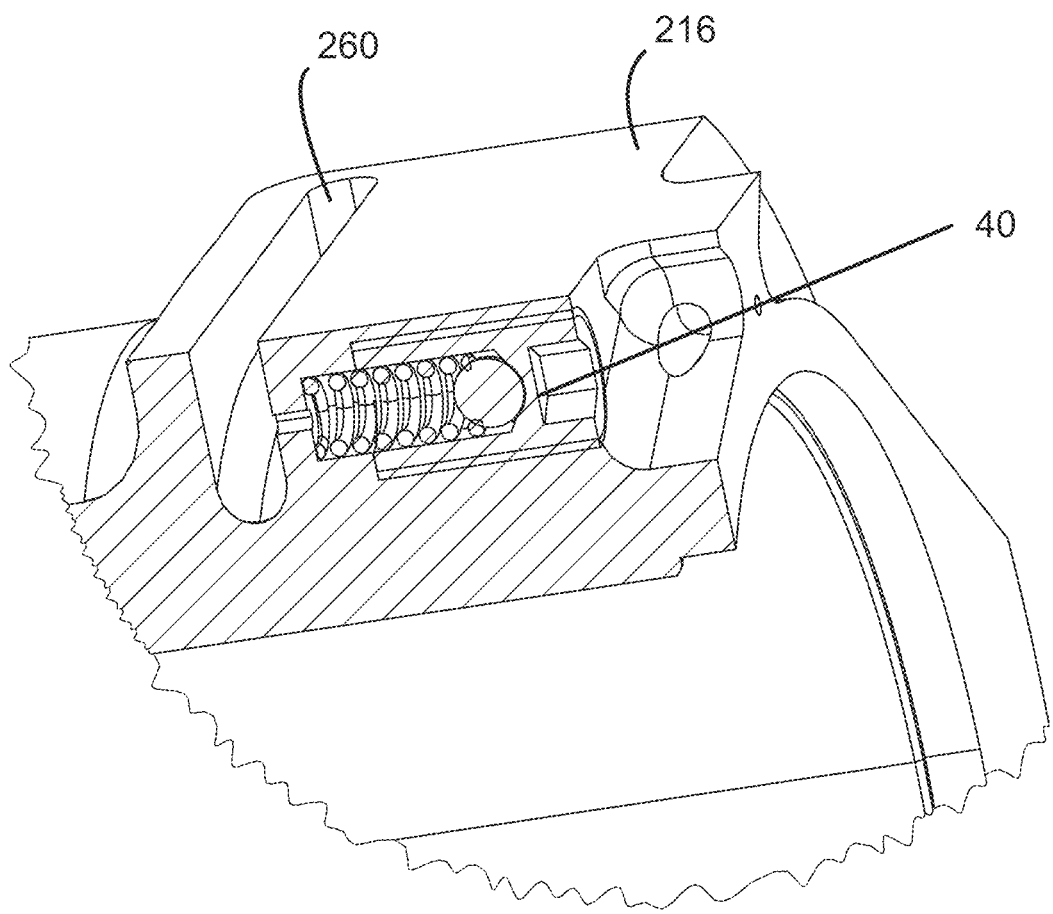
FIG. 16 is an isometric view of a bearing of the gear pump according to the principles of the present disclosure.

It should be appreciated that the present disclosure provides a method of retrofitting existing gear pumps. Referring to FIGS. 11-12, a bearing member 200 that can be retrofitted to include the feature described above is provided. The bearing member 200 is an annular shaped body with an opening 202 that has a spool 210 and first and second lands 212, 214. Flats 216 are provided along peripheral portions of the lands 212, 214 and are designed for mating, abutting engagement with the corresponding flats 216 of an adjacent bearing member 200. A dam 230 segregates an inlet ramp 232 and a discharge ramp 234. A high-pressure arc 236 extends axially inward from a face 238 of the bearing member 200 and over a perimeter/circumferential portion of the land 212. Radial gap flow as represented by reference arrows 250 still flows between the bearing member 200 and the surrounding pump housing (not shown); however, the screened flow through opening 240 covered by the screen 242 is isolated and interconnected with screen flow from the adjacent bearing member 200. To achieve this, a passage 260 is provided in the first land 212. More particularly, the passage 260 is connected to and in fluid communication with the opening 240 that provides filtered flow from the discharge ramp 234. The opening 240 is shown as a series of interconnected, reduced diameter portions 240a, 240b, 240c that extend from the discharge ramp 234 axially through the land 212, the small diameter portion 240c of which is in fluid communication with passage 260.

In one embodiment, the first journal bearing 26 includes a first screened flow through opening and the second journal bearing 28 includes a second screened flow through opening. The first screened flow through opening is interconnected with the second screened flow through opening. The pressure relief valve is in fluid communication with at least one of the first or second screened flow through openings. In one embodiment, the pressure relief valve is recessed in the first journal bearing 26 and coincident with the first screened flow through opening. This configuration allows for easy retrofitting existing journal bearings to include a pressure relief valve. For example, the first screened flow through opening can be machined (e.g., drilled out) to accommodate a pressure relief valve. The overall exterior dimensions and shape of the journal bearing is unchanged even after the incorporation of a pressure relief valve. As such, the pressure relief valve is located within the external dimensions of the journal bearing and does not impact its ability to fit into the space provided for the journal bearing within the gear pump.

Figure 2:
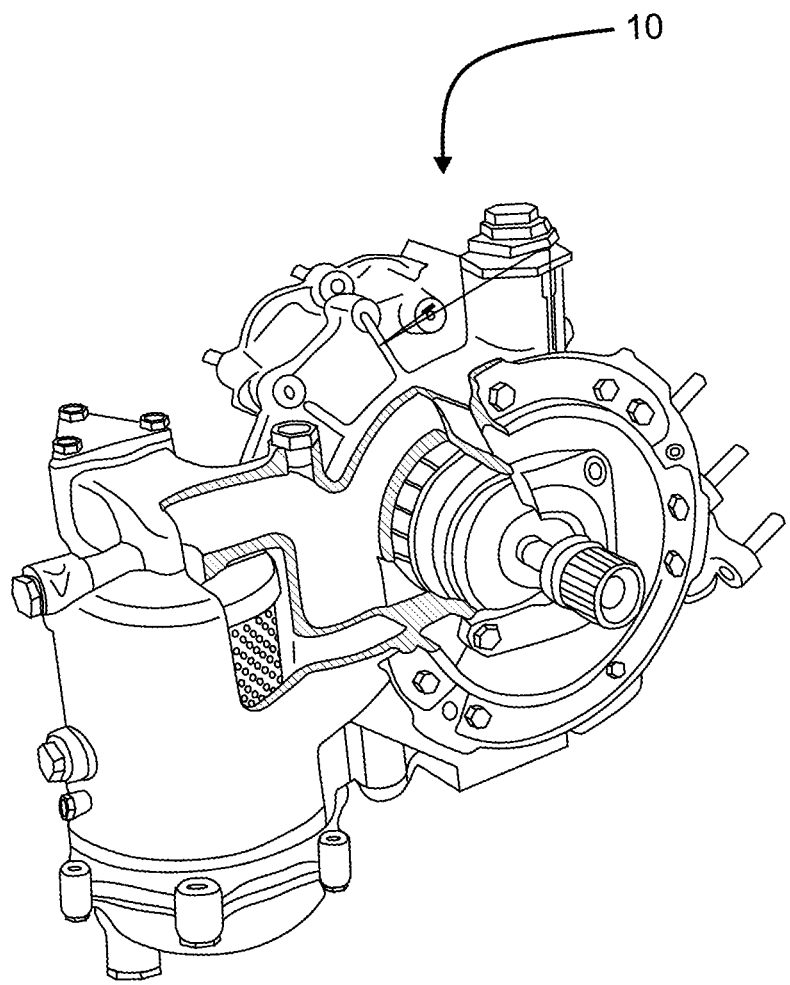
FIG. 2 is an isometric view of a gear pump consistent with the principles of the present disclosure with a portion cut out for viewing.
Figure 3:
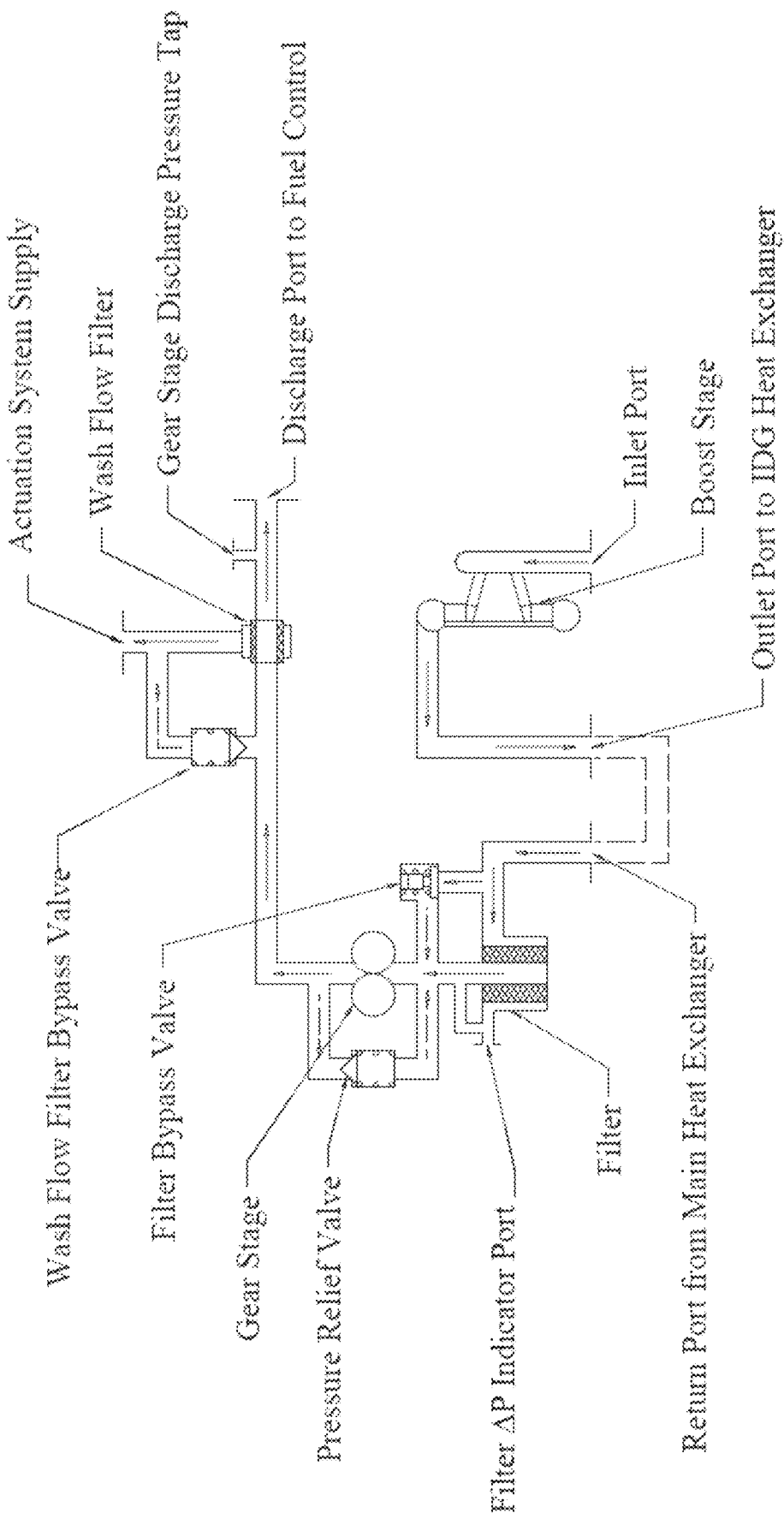
FIG. 3 is a schematic diagram of a fuel delivery gear pump system consistent with the principles of the present disclosure.
Figure 4:
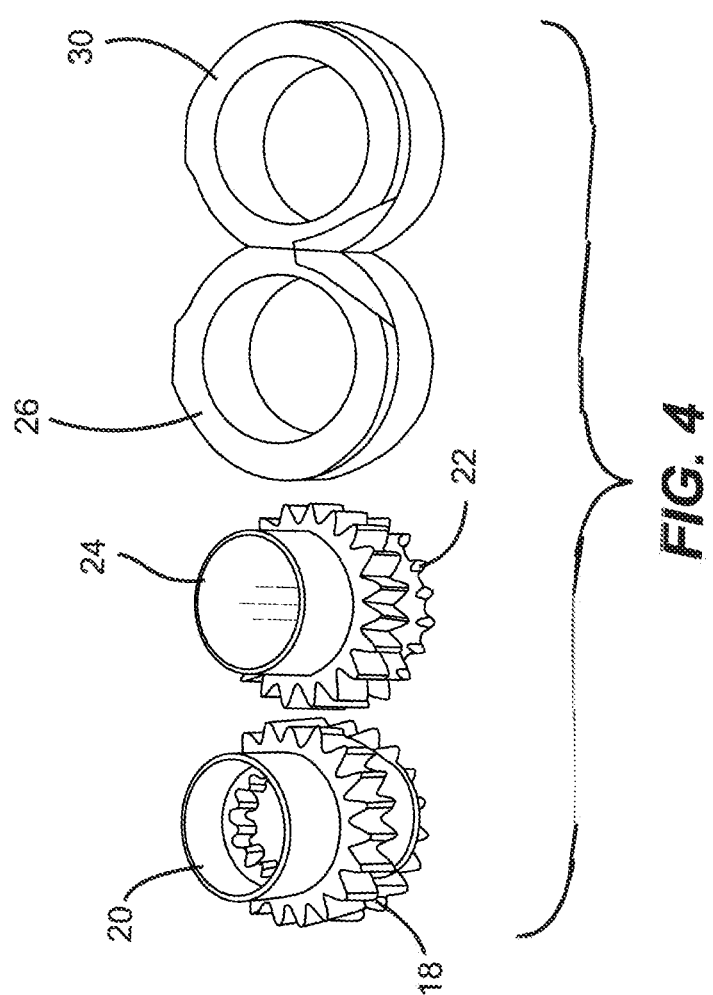
FIG. 4 is an isometric view of components of a gear pump consistent with the principles of the present disclosure.
Figure 5:
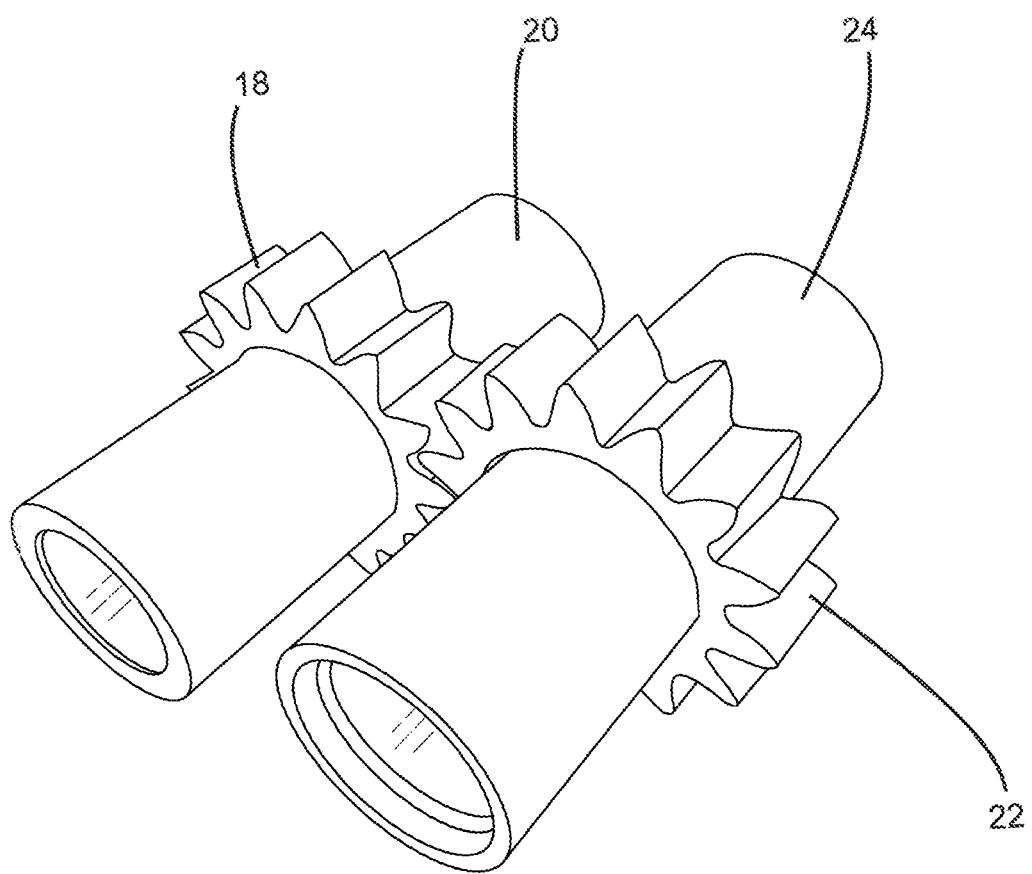
FIG. 5 is an isometric view of components of a gear pump consistent with the principles of the present disclosure.
Figure 6:
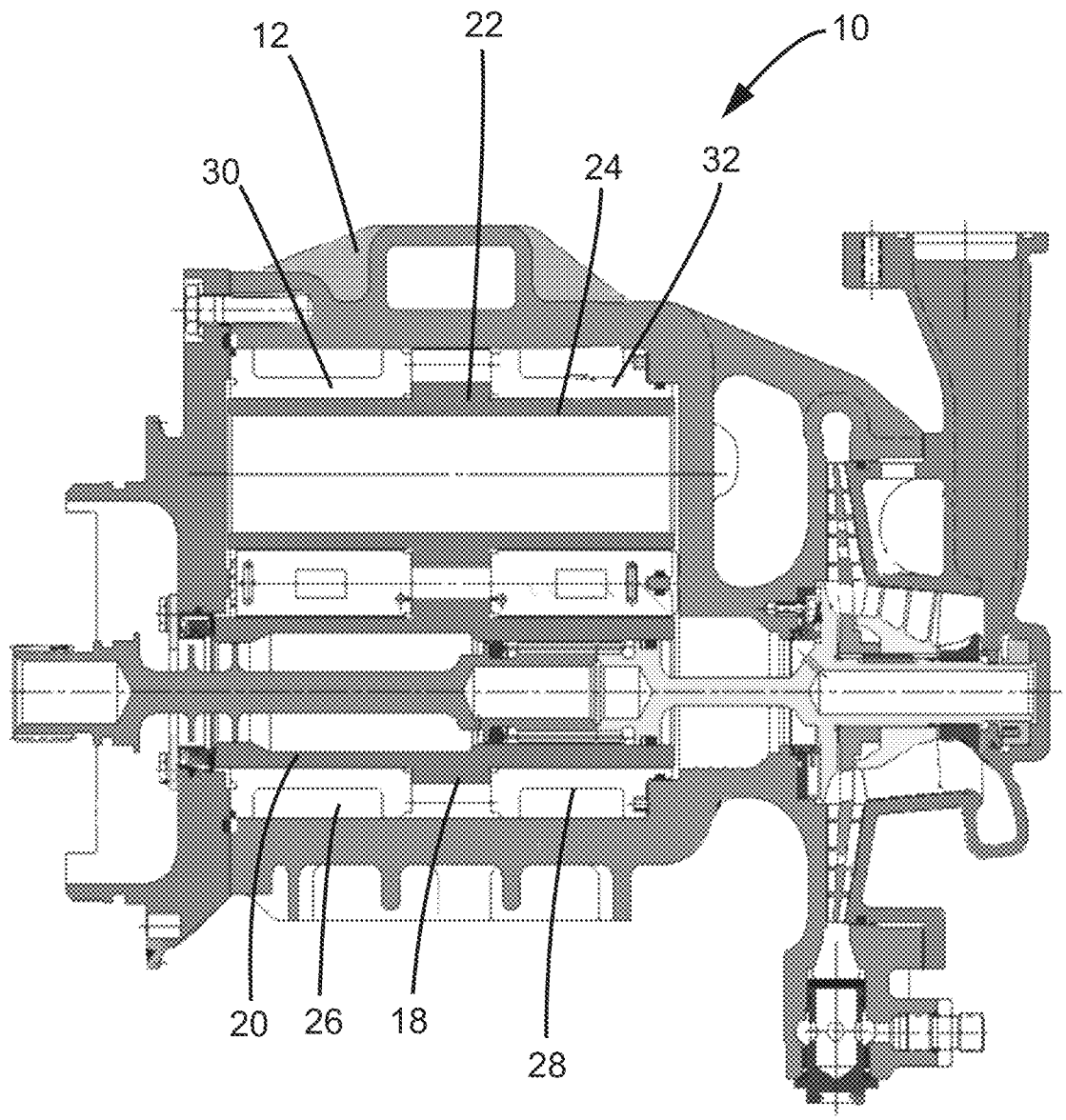
FIG. 6 is a cross-sectional view of a gear pump according to the principles of the present disclosure.

The passage 260 is preferably formed by discrete portions including a recess 262 that extends radially inward from the face 238 of the first land 212 and a small diameter opening 264 that communicates with the feed bearing lube groove 254 (FIG. 5) to supply bearing flow to the gear shaft 104 (FIG. 2). Thus, in the preferred embodiment, filtered flow from the discharge ramp 234 via the small diameter opening 264 is received at one end of the recess 262 and the filtered flow proceeds to opening 264 at the other end of the recess 262. This arrangement does not interfere with the radial gap flow that still flows between the bearing member 200 and pump housing (not shown) as represented by the reference numerals 250. Bearing lubrication flow is available in the event one of the lubrication feed orifices 240 becomes clogged. More specifically, the recesses 262 in the mating flats 216 of abutting bearing members 200 are aligned and in fluid communication with one another. If contaminants were to reduce or block screened flow from one of the openings 240 that receive filtered flow through screen 242, desired screened flow would not reach the passage 260. However, because the recesses 262 are joined to one another to form a combined passage 260, screened flow may be drawn from the passage 260 in the other bearing member 200. This increases the prospect for bearing lubrication flow to be supplied to the feed bearing lube groove 254 via passage 260.

Thus, there is disclosed a bearing body 200 that incorporates a gear-type pump bearing design, which ports fluid from a filter screen 242 located in a bearing assembly at the gear mesh outlet. The ported fluid is fed through a small diameter flow limiting orifice 240 and enters a slot or passage recess 262 included in a bearing flat 216. From the slot 262 included across the flat 216, flow exits through a passage 264 and enters the bearing to feed a bearing lubrication feature (e.g., pad) at the rotating interface with a gear shaft 104. The slot 262 is configured to provide the flow limiting the protected orifice in isolated communication with the bearing lubrication feature.

It should be appreciated that the bearing member 200 can be machined to include the feature of the bearing members 200 in other embodiments disclosed therein. FIGS. 13-16 disclose various variations of the bearing member 200.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A gear pump comprising:
   a pump housing including a fluid inlet and a fluid outlet;
   a drive gear supported on a first shaft, the drive gear being located between a first end portion of the first shaft and a second end portion of the first shaft;
   a driven gear configured to mesh with the drive gear, the driven gear supported on a second shaft, the driven gear being located between a first end portion of the second shaft and a second end portion of the second shaft;
   a first journal bearing secured in the pump housing configured to rotatably support the first end portion of the first shaft, the first journal bearing defining a first bearing shaft interface, the first journal bearing including a first high pressure portion, and a first journal fluid flow path that extends between the first high pressure portion and the first bearing shaft interface;
   a second journal bearing secured in the pump housing configured to rotatably support the second end portion of the first shaft, the second journal bearing defining a second bearing shaft interface, the second journal bearing including a second high pressure portion, and a second journal fluid flow path that extends between the second high pressure portion and the second bearing shaft interface;
   a third journal bearing secured in the pump housing configured to rotatably support the first end portion of the second shaft, the third journal bearing defines a third bearing shaft interface, the third journal bearing including a third high pressure portion, and a third journal fluid flow path that extends between the third high pressure portion and the third bearing shaft interface;
   a fourth journal bearing secured in the pump housing configured to rotatably support the second end portion of the second shaft, the fourth journal bearing defines a fourth bearing shaft interface, the fourth journal bearing including a fourth high pressure portion, and a fourth journal fluid flow path that extends between the fourth high pressure portion and the fourth bearing shaft interface; and
   a pressure relief valve in each of the first, second, third, and fourth journal fluid flow paths.

2. The gear pump of claim 1, wherein the gear pump is a component in a jet engine fuel delivery system and is configured for in-flight delivery of jet fuel to a jet engine.

3. The gear pump of claim 1, wherein the first journal bearing and the third journal bearing include journal contact portions that are in direct contact with each other, wherein a portion of the first journal fluid flow path is open to a portion of the third journal fluid flow path in the journal contact portion thereby defining a joint fluid flow path that allows fluid to flow from the first journal bearing to the third journal bearing and from the third journal bearing to the first journal bearing.

4. The gear pump of claim 1, wherein the second journal bearing and the fourth journal bearing include journal contact portions that are in direct contact with each other, wherein a portion of the second journal fluid flow path is open to a portion of the fourth journal fluid flow path in the journal contact portion thereby defining a joint fluid flow path that allows fluid to flow from the second journal bearing to the fourth journal bearing and from the fourth journal bearing to the second journal bearing.

5. The gear pump of claim 1, further comprising a feed orifice at a junction of the first journal fluid flow path and the first bearing shaft interface.

6. The gear pump of claim 1, wherein the pressure relief valve is at least partially recessed in the first journal bearing.

7. A gear pump comprising:
a pump housing including a fluid inlet and a fluid outlet;
a drive gear supported on a first shaft, the drive gear being located between a first end portion of the first shaft and a second end portion of the first shaft;
a driven gear configured to mesh with the drive gear, the driven gear supported on a second shaft, the driven gear being located between a first end portion of the second shaft and a second end portion of the second shaft;
a first journal bearing secured in the pump housing configured to rotatably support the first end portion of the first shaft, the first journal bearing defining a first bearing shaft interface, the first journal bearing including a first high pressure portion, and a first journal fluid flow path that extends between the first high pressure portion and the first bearing shaft interface;
a second journal bearing secured in the pump housing configured to rotatably support the second end portion of the first shaft, the second journal bearing defining a second bearing shaft interface, the second journal bearing including a second high pressure portion, and a second journal fluid flow path that extends between the second high pressure portion and the second bearing shaft interface;
a third journal bearing secured in the pump housing configured to rotatably support the first end portion of the second shaft, the third journal bearing defines a third bearing shaft interface, the third journal bearing including a third high pressure portion, and a third journal fluid flow path that extends between the third high pressure portion and the third bearing shaft interface;
a fourth journal bearing secured in the pump housing configured to rotatably support the second end portion of the second shaft, the fourth journal bearing defines a fourth bearing shaft interface, the fourth journal bearing including a fourth high pressure portion, and a fourth journal fluid flow path that extends between the fourth high pressure portion and the fourth bearing shaft interface; and
a first journal pressure relief valve in the first journal fluid flow path, a second journal pressure relief valve in the second journal fluid flow path, a third journal pressure relief valve in the third journal fluid flow path, and a fourth journal pressure relief valve in the fourth journal fluid flow path.

8. The gear pump of claim 7, wherein the first journal pressure relief valve, the second journal pressure relief valve, the third journal pressure relief valve, and the fourth journal pressure relief valve all are configured to allow flow therethrough at a common predetermined pressure.

9. The gear pump of claim 7, wherein the first journal pressure relief valve is recessed into the first journal bearing, the second journal pressure relief valve is recessed into the second journal bearing, the third journal pressure relief valve is recessed into the third journal bearing, and the fourth journal pressure relief valve is recessed into the fourth journal bearing.

10. The gear pump of claim 7, wherein the first journal pressure relief valve is fully recessed in the first journal bearing.

11. A gear pump comprising:
a pump housing including a fluid inlet and a fluid outlet;
a drive gear supported on a first shaft, the drive gear being located between a first end portion of the first shaft and a second end portion of the first shaft;
a driven gear configured to mesh with the drive gear, the driven gear supported on a second shaft, the driven gear being located between a first end portion of the second shaft and a second end portion of the second shaft;
a first journal bearing secured in the pump housing configured to rotatably support the first end portion of the first shaft, the first journal bearing defining a first bearing shaft interface, the first journal bearing including a first high pressure portion, and a first journal fluid flow path that extends between the first high pressure portion and the first bearing shaft interface, wherein the first journal bearing includes a side face that includes a dam that segregates an inlet ramp and a discharge ramp, and a high-pressure arc that extends axially inward from a face of a bearing member;
a second journal bearing secured in the pump housing configured to rotatably support the second end portion of the first shaft, the second journal bearing defining a second bearing shaft interface, the second journal bearing including a second high pressure portion, and a second journal fluid flow path that extends between the second high pressure portion and the second bearing shaft interface;
a third journal bearing secured in the pump housing configured to rotatably support the first end portion of the second shaft, the third journal bearing defines a third bearing shaft interface, the third journal bearing including a third high pressure portion, and a third journal fluid flow path that extends between the third high pressure portion and the third bearing shaft interface;
a fourth journal bearing secured in the pump housing configured to rotatably support the second end portion of the second shaft, the fourth journal bearing defines a fourth bearing shaft interface, the fourth journal bearing including a fourth high pressure portion, and a fourth journal fluid flow path that extends between the fourth high pressure portion and the fourth bearing shaft interface; and
a pressure relief valve in at least one of the first, second, third, or fourth journal fluid flow paths, wherein the first journal bearing includes a first screened flow through opening and the second journal bearing includes a second screened flow through opening, wherein the first screened flow through opening is interconnected with the second screened flow through opening, wherein the pressure relief valve is in fluid communication with at least one of the first or second screened flow through openings.

12. The gear pump of claim 11, wherein the pressure relief valve is fully recessed in the first journal bearing and coincident with the first screened flow through opening.

13. The gear pump of claim 12, wherein a second pressure relief valve is fully recessed in the second journal bearing and coincident with the second screened flow through opening in the second journal bearing.

* * * * *